July 5, 1949.　　　J. A. JACKSON　　　2,475,504
REDUCTION GEAR

Filed March 10, 1945　　　　　　　　4 Sheets-Sheet 1

INVENTOR
Jesse Alverth Jackson
WITNESS
R. H. Pennington

INVENTOR
Jesse Atwater Jackson

July 5, 1949.                    J. A. JACKSON                    2,475,504
                                REDUCTION GEAR
Filed March 10, 1945                                      4 Sheets-Sheet 3
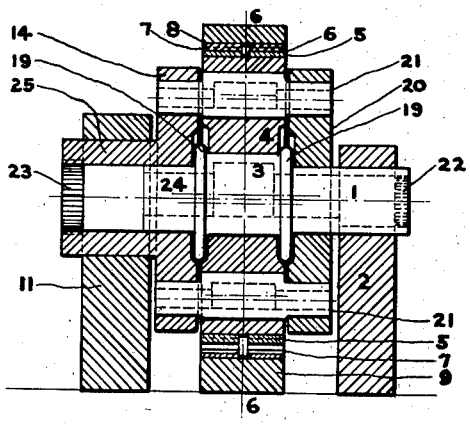
Fig. 7
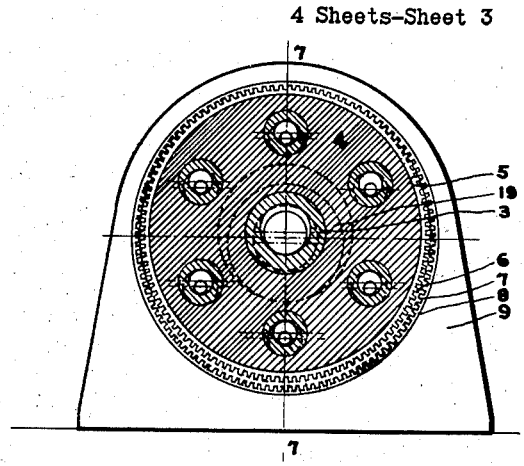
Fig. 6
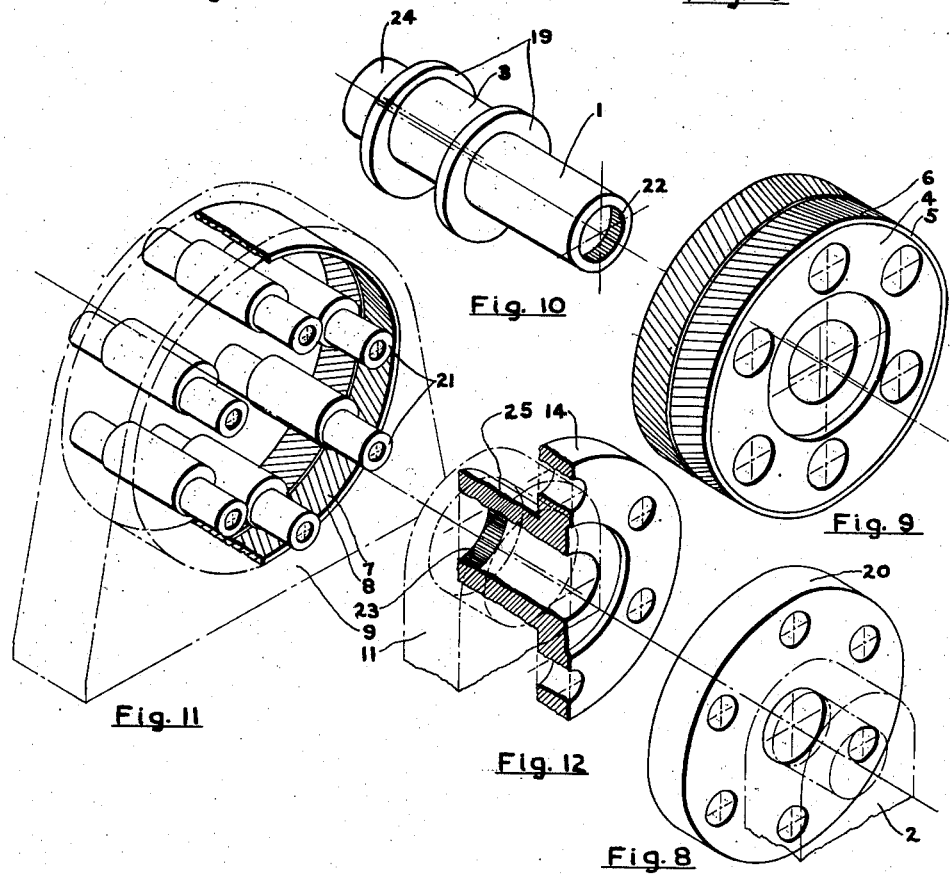
Fig. 11
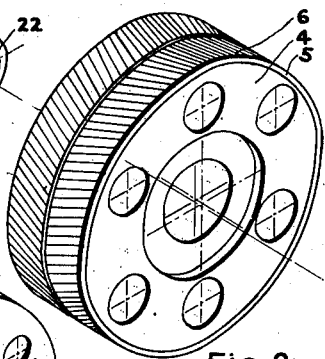
Fig. 10
Fig. 9
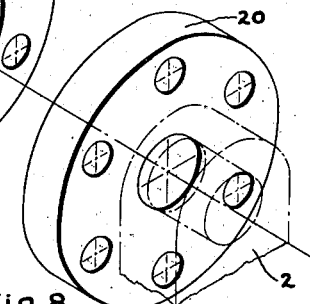
Fig. 12
Fig. 8
INVENTOR  Jesse Atwater Jackson
WITNESS   S. K. McDall.

July 5, 1949.

J. A. JACKSON 2,475,504

REDUCTION GEAR

Filed March 10, 1945

INVENTOR Jesse Atwater Jackson
WITNESS Robert T. Pennington

Patented July 5, 1949

2,475,504

UNITED STATES PATENT OFFICE 2,475,504

REDUCTION GEAR

Jesse Atwater Jackson, Pensacola, Fla.

Application March 10, 1945, Serial No. 581,985

3 Claims. (Cl. 74—804)

The object of this invention is to provide an improved mechanism for reducing the speed of rotation of the shaft of an engine, turbine, motor or other means of supplying power to a slower application of this power thru a propeller, impeller, wheel or any other useful rotating device. This is accomplished by the combination of a fixed internal gear having a large pinion or rolling gear which is driven hypocycloidally by means of a simple eccentric crank, together with an arrangement of rigid kinematic links which transform that hypocyclic motion into a steady rotation of the slow speed driven shaft. Said kinematic linkage employs a number of short rigid links each of which is pin connected to the rolling wheel on centers spaced uniformly and equidistant from the center line of said rolling wheel, the other end of each short link being pin connected to a spider on the end of the driven shaft, said connections being spaced uniformly and equidistant from the center line of said driven shaft.

Because of its particular design this device is particularly adapted for high ratios of reduction between speeds of drive and driven shafts. Its nature is such that it may be made very compact for the power which it is to deliver. A further advantage for most applications is that the drive and driven shafts are aligned on the same centerline, while its outstanding superiority over other types lies in the kinematic linkage of the parts which will deliver its power at the reduced speed with inherent smoothness and freedom from vibration.

In many types of rotating machinery the designer of the engine or other source of motive power and the designer of the machine or equipment for the useful application of that power are often faced with the necessity of effecting a compromise between the designed speeds which they would like to use for their equipment in the interest of best efficiency, and the ratio of speed reduction which is practical in consideration of the various factors such as space limitation, rotating masses, vibration and noise, lubrication, overall performance, etc., which enter into the usual design of such speed reduction mechanism.

In ships' propulsion machinery, for example, gear reduction ratios as high as 80:1 have hardly every been used, figures in the vicinity of 60:1, by means of double reduction, having been used more often in recent merchant practice where a high ratio is desired. At the same time, advances in marine steam turbine design, while they have been accompanied by the use of somewhat higher steam pressures and have resulted in note-worthy improvements in water-rates, have not gained the full benefits that would have accrued had there also been permitted a somewhat proportionate increase in turbine R. P. M. Likewise, a gear noise and gear housing vibrations have given trouble in certain cases of conventional double-reduction design. At the other end of the shafting, cavitation of the propeller blades and vibrations in the ship's stern from pulsations in the water between propeller blades and ship's shell plating have both been troublesome problems for the designer.

In the field of aircraft and automotive engines, the development of types employing higher rotating speeds has languished due to the inertia effects which enter in with the planetary and other types of reduction gearing previously used.

There are many other fields where the range of usefulness of rotating equipment, from the largest to the smallest sizes, can be greatly expanded by the employment of a smoothly running and positively acting mechanism having a high ratio of reduction in one compact unit such as is described herein.

As compared to previous designs employing trains of spur or planetary gears having equivalent compactness and reduction ratios, this invention has the advantage, in its simplest form, of having only one pair of meshing gears, whose teeth, at the moment of contact, do not have a high tangential velocity, and therefore do not have the high dynamic tooth loading that accompanies that kind of tooth action. Tooth loading, therefore, is set up largely by the crank linkage which causes the hypocyclic action of the rolling gear, and it is small in comparison to the driving force due to the proportions of the instantaneous leverage involved.

The present invention lends itself readily to ease and cheapness of manufacture since all of the machining operations are such as can be performed readily on standard machine tools; while those operations for which great accuracy is required can be handled appropriately by well known methods, as will be mentioned later. Reliability in operation can be insured since the proportions of the parts may be chosen to provide a uniform factor of safety.

Two general types of this invention will be described; the single wheel type, in which the use of balance weights on the drive shaft offsets the eccentric portion of the mass of the rolling wheel, and the multiple wheel type in which the eccentric portions of the masses act mutually to balance each other.

Referring to the drawings, three embodiments are considered in the following order: First, a description of the device in its simplest form together with a discussion of the kinematic linkages and forces involved; second, a single wheel type in the form best suited for marine propulsion, or for the roll-neck drives in steel mills, etc.; and third, a double wheel design for the smaller sizes, such as for aircraft or automotive use.

Figures 1, 2, and 3 relate to the device in its simplest form.

Figures 6, 7, 8, 9, 10, 11 and 12 relate to a single wheel counterbalanced type suitable for large powers.

Figure 6 is a sectional end view taken on the line 6—6 of Figure 7.

Figure 7 is a sectional elevation taken on the line 7—7 of Figure 6.

Figure 8 shows the forward support spider 20.

Figure 9 shows the rolling gear wheel 4.

Figure 10 shows the main driving cam shaft 1.

Figure 11 shows the crank pin connecting links 21.

Figure 12 shows the after driven spider.

Figure 13:
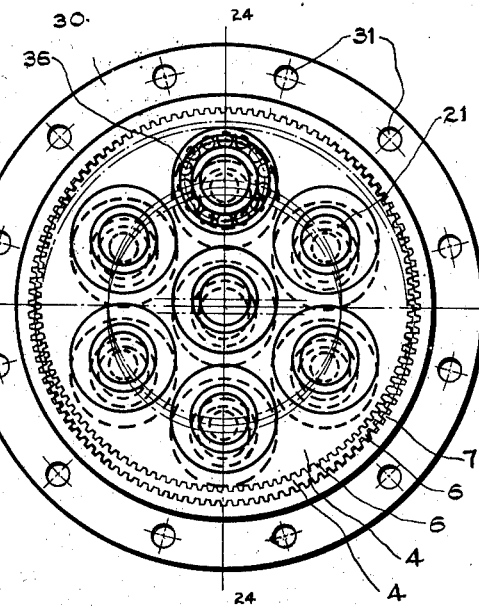

Figure 13 is an end view taken on the line 23—23 of Figure 24.

Figure 14:
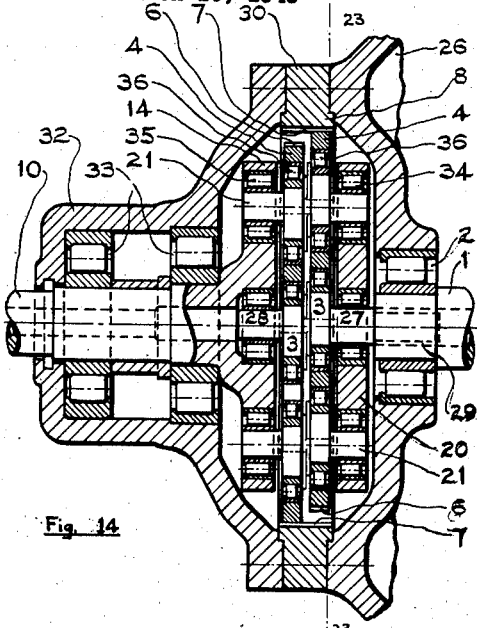

Figure 14 is a sectional elevation taken on the line 24—24 of Figure 13.

Figure 15:
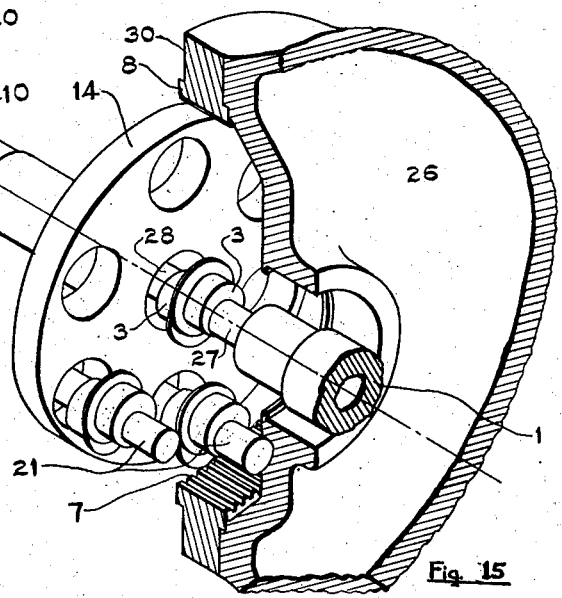

Figure 15 shows the stationary housing support and internal ring gear with drive cam shaft, two crank pins, and the driven spider in position.

Figure 16:
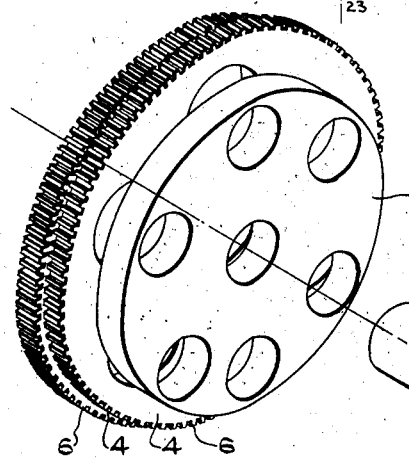

Figure 16 shows the support spider and the two main rolling gear wheels in relative position.

In the following description, the same part numbers are used for similar parts having the same function in the different embodiments.

Figure 2:
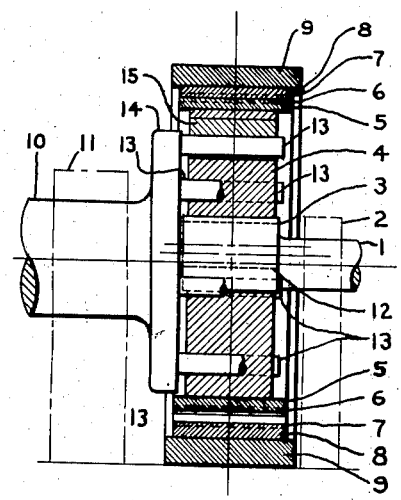
Figure 2 is a sectional elevation taken on the line 2—2 of Figure 1.
Figure 1:
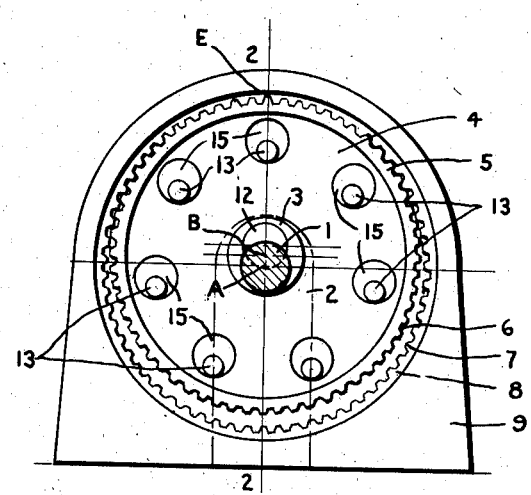
Figure 1 is an end view of the device.
Figure 3:
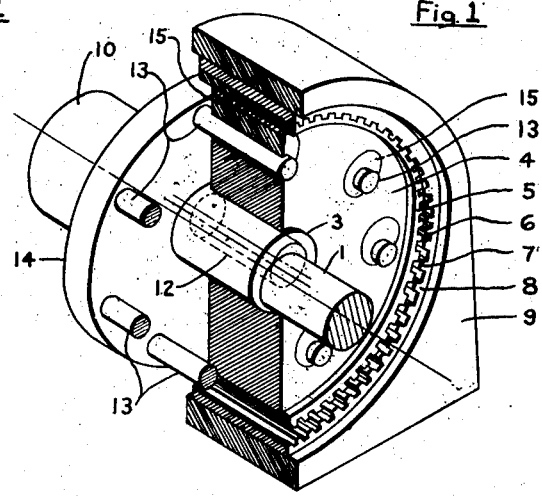
Figure 3 is an assembly view partially cut away.

Referring to Figures 1, 2 and 3, this device functions, in simplified form, as follows: The drive shaft 1 is rotatably supported on bearings such as 2, which are shown in outline for clarity of the picture. Said drive shaft 1 has an eccentric portion, hereafter called the driving cam 3. Supported rotatably on the driving cam 3 is a rolling gear wheel 4 having a rim 5 with teeth 6 on its periphery which mesh with corresponding teeth 7 on a stationary internal ring gear 8 mounted in a suitable foundation piece or holding ring 9. With the turning of the drive shaft 1, the rolling gear 4 moves within the stationary gear 8 in such a way that its pitch circle rolls within the larger stationary pitch circle of 8. Thus, a point on the rolling pitch circle traces an hypocycloid whose cusps are separated along the arc of the stationary pitch circle by a distance equal to the difference of the circumferences of the two pitch circles. Every full rotation of the driving cam 3 gives the center of the rolling wheel 4 a primary motion in one direction about a circle whose center A is the drive shaft center and whose radius AB is the eccentricity of the driving cam 3, and this is accompanied by a secondary motion of retardation or counter-rotation thru an arc whose length is equal to the difference of the pitch circumferences. The meshing of the teeth 6 and 7 ensures hypocyclic action, without slipping, thus providing an exact ratio of reduction between the angular rotation of the drive shaft 1 and the secondary rotation of the rolling gear 4. Since the rotation of the drive shaft 1 is with uniform angular velocity, then the resulting counter-rotation of the rolling wheel 4 is at a constant angular velocity also. The total motion of the rolling gear 4 is a combination of said primary and secondary motions, and these are transformed into the steady rotation of the driven shaft 10 in its bearings 11 by means of a set of elementary four-bar kinematic linkages operating together or in parallel and not in train or in series. These linkages may be seen by referring to the diagram, Figure 5, of the drawings. For each linkage, points A, E, G and H represent the pivots; AE represents the fixed link, common to all; EG represents the driver crank for each linkage, each crank having the common fixed pivot E; GH represents the connecting link; and HA represents the driven crank, each of which has the common fixed pivot A. Referring back to Figures 1, 2, 3 and 5, the driver cranks EG are common to each other in the rolling wheel 4, the connecting links GH are the eccentrically bored bushings 15 rotatable in holes in 4 and about the pins 13, and the driven cranks AH are common to each other in the spider 14. These linkages are represented instantaneously, since the point of tooth contact, representing a fixed pivot so far as each of the four-bar linkages is concerned, moves constantly about the stationary pitch circle at the speed of the drive shaft, while the length of each driver crank EG is constantly changing. It is apparent that each rolling rotation of the rolling gear 4, about the circle centered at A whose radius is AB, causes a rotation of each connecting link GH in the same direction, about a circle centered on its pin at H and having a radius GH equal to AB. Assuming clockwise rotation of the driver, the point of tooth contact E moves around the pitch circle of the stationary gear once for each rotation of the drive shaft, and as it does so, the relative lengths of those driver cranks EG which lie in the semi-circle ahead of E are becoming shorter while the others are lengthening. At the same time the connecting links GH remain parallel to the line of centers AE, while the follower cranks AH remain constant in length and turn uniformly about point A, which for them, has the same center but is rotatable with respect to the drive shaft. The torque exerted on the drive shaft 1 applies the force Bb at the lever arm AB. Since the rolling gear wheel 4 is pin connected on the eccentric cam 3 of the drive shaft 1, there can be no direct leverage exerted thru AB to cause a reaction against the tooth at E.

Such a force does exist, however, and it is seen to be due to the dynamic effect of the rotation of the mass of that part of the rolling wheel 4 which is eccentric plus the mass of the eccentric parts of the bushings 15; i. e., that part of the wheel 4 which lies outside of a circle centered on A and having a radius equal to (AE−2AB), plus that part of each eccentric bushing 15 which lies outside of a circle centered on H and having a radius equal to the shortest distance from H to the outer surface of the bushing 15. The rotation of these masses, which are substantially crescent shaped and have their common center of gravity at some intermediate point on the line EB, would expend an appreciable amount of the power of the drive shaft except for the fact that they can be suitably counterbalanced so as to hold the energy represented in the form of potential energy known as flywheel effect. Such counterbalancing is illustrated by means of the dotted lines 12 showing a hollow portion of the driving cam 3, which has the effect of fixing the center of gravity of the mass of said cam at a point opposite center A from the center of gravity of the mass of the crescent shaped portion referred to above. Such counterbalancing could be done in another manner by adding offset weights to the drive shaft 1 at each end of the cam portion 3, but this method was not chosen for illustration in this embodiment by reason of the necessity for clarity and simplicity of the drawings.

The force B$b$ and lever arm AB therefore represent the torque which is applied instantaneously to turn the rolling wheel 4 about the instantaneous center E. This application of torque is opposed by reactions through the points G exerted from the spider pins 13 of the driven spider 14 fixed on the end of the driven shaft 10 and acting through the connecting links GH which are the eccentrically bored bushings 15 rotatable in the holes of the rolling wheel 4. All points of support of the rolling wheel 4 are pin connections or the equivalent, including the instantaneous center E, therefore said rolling wheel is in effect a lever with load applied at B, pivoted at E, and reactions distributed among points G, the forces normal to the EG arms at the G points being inversely proportional to the lengths of their lever arms EG, and the torque represented by each force G$g$ times its lever arm EG being equal to the total torque divided by the number of cranks or G points. Each of the G$g$ forces has another component in the EG direction, and the resultants of these which must lie in the connecting link direction GH are shown by the dotted line vectors drawn from the points G and transferred with equal lengths to the points H. The resolution of these dotted vectors from the points H, into pairs of components in the HA directions and normal to HA, gives us the vectors representing the forces H$h$ which are seen to be all equal and directed counterclockwise, thus indicating steady rotation of the spider pins 13, the spider 14 and the driven shaft 10 about their centerline at A.

The bearing reaction at the after bearing 11 is the vector sum of the vector components in the HA directions, passes through the point A and is opposite in direction from B$b$ which makes it alike in point of origin and direction to the bearing reaction at the forward bearing 2.

The rotating moments of inertia of the high speed parts are all in the assumed clockwise direction, as follows: the mass of the crescent shaped portion of the wheel 4 referred to above acting at its center of gravity which lies at some point along EB; the sum of the masses of the crescent shaped portions of the eccentric bushings 15 referred to above acting at their common center of gravity which also lies at a point on the line EB; and the mass of a suitable counterbalancing weight fixed on the drive shaft 1 so that its center of gravity lies on the line EB extended oppositely beyond point A. The rotating moment of inertia of the low speed parts is in the counterclockwise direction and is equal to the sum of those portions of the masses of the wheel 4 and bushings 15 not included in the crescent shaped portions referred to above multiplied by the square of their common radius of gyration from point A.

For best operation of this device, the tooth proportions must be carefully chosen for any particular design and they are dependent upon the reduction ratio in an interesting and important way.

The action of the rolling gear is cycloidal, which means that we have a rolling circle representing the rolling gear which rolls in tangential contact with a stationary circle representing the stationary internal gear. Since a point on the rolling circle moves radially as it reaches and leaves its point of tangency with the stationary circle it is necessary that the curvature of the tooth at this point be tangent to a radial line to avoid a wedging action between the driving cam and the tooth in contact. It is also desirable thus to insure that the force on the tooth will be tangential and therefore obviate any tendency of the tooth to climb out of its mating space. To achieve these objectives it is sufficient to use a cycloidal tooth with the rolling and stationary circles serving as the base circles, and radii for the describing circles suitably chosen to give proper clearance between the teeth at all points except at or near the point of tangency of the base circles. These base circles then are logically the pitch circles of the teeth and are so referred to herein. The faces and flanks then are epicycloids or hypocycloids described by circles rolling on the pitch lines, either inside or outside as the case may be, but they are not the same as the cycloidal or trochoidal curves traced by points on the surfaces of the teeth as they actually move in engagement with each other. The radii of the describing circles must be carefully chosen to avoid the trochoidal effect which may cause interference due to the fact that a point on the face of a tooth traces a trochoid (prolate epicycloid or curtate hypocycloid) having a loop instead of a cusp with respect to the base circle with which it mates. Furthermore, the faces will interfere if the radius of their describing circle is greater than half the difference between the radii of the pitch circles, which is the theoretical condition for contact. If a generating system is used for cutting the teeth, the faces and flanks are both cut by the edged faces of the cutter teeth which may have radial flanks or any shape which will give the flanks sufficient clearance to keep them out of action.

The cutter faces then will be epicycloids whose describing circle must be greater than half the difference between the pitch circle radii to insure that the epicycloids which they cut for the faces of the rolling gear and the hypocycloids which they cut for the faces of the stationary gear will be those whose describing circles are less than half the difference between the pitch circle radii, thus providing for clearance between the faces of the cut teeth except at the pitch line. The same cutter faces will generate flanks on the cut teeth whose describing circles are like the cutter faces in being greater than half the difference between the pitch circle radii, thus providing for clearance between the flanks and those faces which mesh with them except at the pitch line, since those faces are of lesser describing circles.

For any method of cutting the teeth, the necessary clearances to give contact at the pitch line only will be secured if the describing circle for the faces is smaller than half the difference of the pitch circle radii, and the describing circle for the flanks is equal or greater than half the difference of the pitch circle radii, no matter how close, theoretically, are these sizes of the describing circles to each other. From the practical point of view, however, due to inaccuracies in gear cutting, which in first class work may be extremely minute but are still humanly unavoidable, the describing circles should be so chosen that the ratio of their diameters is a fraction whose numerator and denominator are integers. From the design point of view, to keep to simplicity of the gearing used in the cutting machine, neither of the cut gears should have a prime number of teeth, while one of them should have an even number of teeth. Likewise, to provide for more even wear of the teeth, the number of teeth of the cut gears should be prime to each other, which means that the difference will be an odd number. Furthermore, to permit interchangeable teeth the describing circles of the tooth faces on all gears should be the same and likewise for the flanks. For these reasons it is suggested that the reduction ratio for any pair, together with the pitch radii and the numbers of teeth, be chosen in accordance with the following equations: For tooth faces; radius of the describing circle divided by the radius of the larger (stationary) gear equals the fraction whose numerator is the difference of the numbers of teeth minus an integer (preferably one) and whose denominator is twice the number of teeth of the larger (stationary) gear. For tooth flanks (faces of generating cutters); radius of the describing circle divided by the radius of the larger (stationary) gear equals the fraction whose numerator is the difference of the numbers of teeth plus zero or an integer (preferably one) and whose denominator is twice the number of teeth of the larger (stationary) gear. This system should be equally applicable for pairs of helical external gears in which the accuracy of cutting and adjustment is such that the damping effect of a pressure angle is not a practical requirement. For ordinary spur teeth designed by this system we should have contact, i. e., describing circles should be equal so there would be continuous contact at all times.

The width and height of tooth chosen for any particular pair of gears used with this device are tied in very closely with the reduction ratio, the pitch diameters, and the numbers of teeth. Height of tooth for best strength can be about equal to tooth width and thus somewhat shorter than conventional teeth due to the shorter length of the arc of contact with the form of tooth as outlined above. The height of tooth which is chosen for any particular pair and that part of the pitch circle over which the teeth are in mesh are proportional, i. e., the tooth height is proportional to the difference of the pitch diameters approximately as the angle of mesh is to the full circle. The angle of mesh is defined as the angle measured on the pitch circle within which any part of the teeth of one gear enter the spaces between the teeth of the other gear. From a practical point of view the tooth height which determines this angle of mesh may be as small as desired, provided it is large enough to leave an appreciable part of the tooth face at the tip outside of the region of contact, i. e., a portion of the face which will not show wear due to the clearance provided by the smaller describing circle used for the faces. Of course the addendum distance must be less than the dedendum distance to provide clearance between the tips of teeth and the bottoms of the mating spaces. The conclusion to be drawn from these matters is that, in general, the higher the reduction ratio, the smaller must be the tooth that is used. For anything as big as a ship's gear, this does not impose any practical limitation for ratios below 200 to 1, or even higher if it should be found possible to use a tooth width two or three times its height. For smaller equipment, ratios above 100 to 1 are quite suitable, while for the smallest sizes the type known as a pin gear would be more suitable, at ratios as low as desired, and could be designed to give continuous contact of all the pins or projections all the way around the circle.

It will be apparent that an embodiment of this device can readily be designed for driving at the slow speed end to produce a higher speed from the main cam shaft, and that such an arrangement would have distinct advantages due to having only one pair of meshing gears which are so nearly the same in diameter that the tooth stresses at the root fillets would be nearly the same.

It should be noted that the design details of the first embodiment were selected solely for simplicity of explanation of the mechanism, while the practical features are more thoroughly developed in the second and third embodiments described below.

Figure 4:
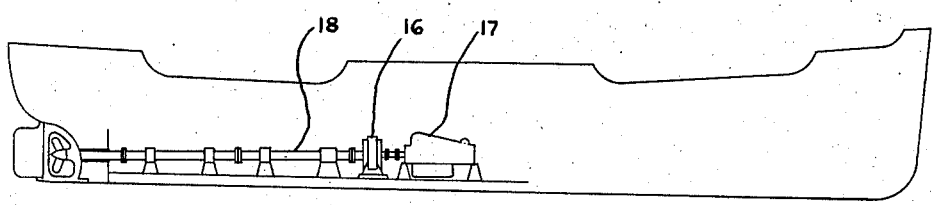
Figure 4 is a profile of a ship showing alignment of propulsion machinery.

Figure 4 shows how this type of gearing would be situated aboard ship with relation to the main engine 17 and the propeller line shafting 18.

For the second embodiment of this invention, Figures 6 to 12, inclusive, show a design wherein the counterbalancing is effected by the addition of the offset weights 19 at each end of the cam portion 3 of the drive shaft 1. A forward support spider 20 is provided to carry the forward ends of the connecting links GH (of Figure 5), which in this embodiment are the crank pins 21 serving the purpose of the eccentrically bored bushings 15 of Figures 1, 2 and 3. The complete unit is arranged here to be mounted independently of the driving engine and the driven equipment, as indicated by the teeth 22 and 23 at the high speed and low speed ends respectively for connection of toothed-type flexible couplings. The forward end of the drive shaft 1 is rotatably supported by the bearing 2, while the other end is provided with a concentric portion 24 which is rotatably supported in a bearing surface in the driven spider 14. The driven spider 14 has a bearing surface 25 which is suitably supported in an after bearing support 11. The rolling wheel 4 has a rim 5 provided with teeth 6 which in this embodiment are indicated as of double helical type. This type of tooth in addition to smoother action and greater strength has the advantage of keeping the rolling gear 4 in alignment and minimizing end play. These teeth 6 mesh with teeth 7 of the foundation piece 9.

Figure 5:
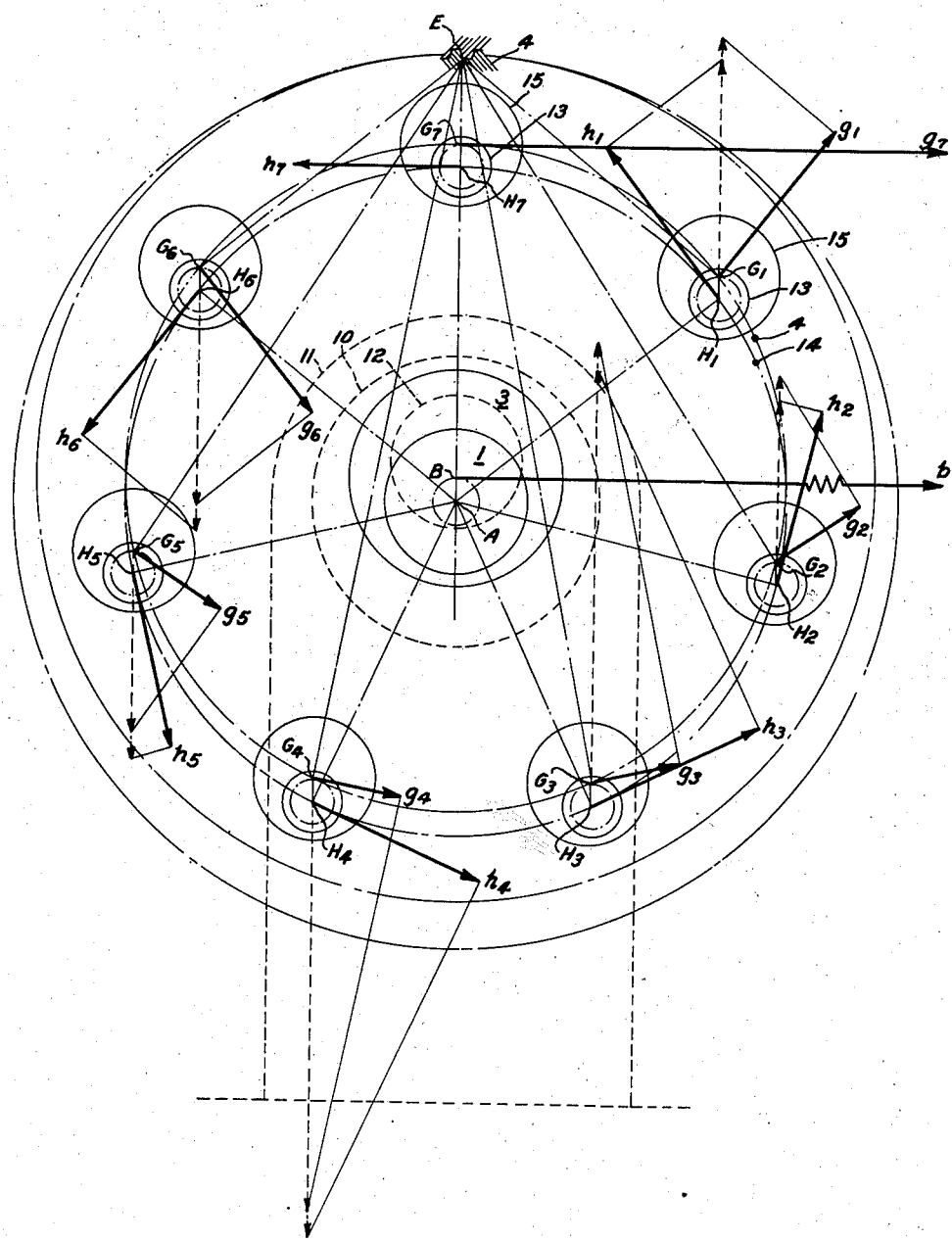
Figure 5 is a kinematic diagram showing force vectors.

The operation is the same as outlined for the embodiment of Figures 1, 2 and 3 and the forces apply as in Figure 5 since the kinematic linkages are the same.

In the process of manufacture of the parts, the turning of the cylindrical surfaces of the drive shaft 1 and the crank pins 21 must be accurately done to ensure that the distance between the centerlines of the bearing and cam portions of each is equal to the same measurement for all the others. Also, the boring of the holes in the rolling wheel 4, the forward support spider 20, and the driven spider 14, must be accurately done to ensure that the distances between their centerlines are correct and mutually equal among the wheel and spiders. While the requirement for great accuracy in these turning and boring operations is critical, the methods by which it can be accomplished are those which are well known in the toolmakers' art. Such methods are dependent upon what is known as "toolroom accuracy in the location of holes" which in turn is derived from turning operations that in themselves are independent of the accuracy of the lathe upon which they are performed. The expense, therefore, involved in obtaining the required accuracy in this device would be a reasonable item in its cost of manufacture, since the methods and equipment to be employed exist already in many industrial plants.

The choice of materials and methods of fabrication can readily be suited to the facilities available, i. e., the foundation piece and holding ring 9, and the bearing supports 2 and 11 could be either castings or weldments; the rolling wheel 4 and the spiders 14 and 20 could be either castings or forgings; while the shaft 1 and the links 21 could be either forgings or machined from bars depending on the size.

In this embodiment the order of assembly of the parts is governed by the fact that an internal-external pair of gears of this sort must be put together by sliding from the ends of the teeth rather than moving them radially across the tips as can be done with conventional spur gears. This makes it necessary, due to the oppositely turning helices of the double helical teeth, that either the internal gear ring 8 or the rolling gear ring 5 shall be split centrally around its circumference between the two sides. Another necessary feature of this design is that one of the offset weights 19 must be made separate from and keyed or shrunk later on the drive shaft at 1 or 24 so that the cam portion 3 can first be assembled in the wheel 4.

For the third embodiment, Figures 13, 14, 15 and 16 show a double wheel design in which offset weights for balancing are not necessary, since the center of mass of each wheel and each eccentric portion of each cam or link has its counterpart which is oppositely placed with respect to the main centerline of the device. A similar development for a three wheel design could be made, in which the wheels and the cams would be spaced 120 degrees apart.

Referring to the drawings, the drive shaft 1 is rotatably supported by the roller bearing 2 which is mounted in the housing or crank case 26 of a driving motor or engine. The driving cams 3, 3 are made on a separate part which has a journal portion 27 for supporting the support spider 20 and journal 28 for centering its other end in the driven spider 14. For assembly purposes, this driving cam part is splined or keyed in the end of the drive shaft 1, as indicated at 29. The cams 3, 3 are spaced 180 degrees apart, and thus support the rolling wheels 4, 4. The teeth 6, 6 of the rolling wheels 4, 4 are shown in mesh at top and bottom respectively with the corresponding teeth 7 on the stationary internal ring gear 8. Said ring gear 8 is made with a flanged portion 30 for bolting thru holes 31 to the housing 26. The driven shaft 10 is shown as integral with the driven spider 14 and is supported rotatably in the bearing cap 32 by means of the roller bearings 33. The crank pins 21 are supported in the spiders 14 and 20 by roller or ball bearings 34, 35 and 36. The bearing cap 32 is arranged to be mounted with the same bolts as the gear flange 30, and completes the enclosure for the device to permit lubrication by packing with grease or by forced feed of oil thru the housing 26 or the shaft 1 from the lubricating oil supply system of the driving engine if available. This embodiment could readily be designed with journal bearing surfaces for the moving parts instead of the roller bearings shown, and likewise the second embodiment could be designed for roller or ball bearings if desired.

I claim as my invention:

1. In a reduction gear for ratios above 85:1, a driving shaft including an eccentric driving cam, a stationary internal gear having at least 80 teeth, a rolling gear wheel having equispaced circular openings therein, mounted on the driving cam and meshing with the stationary internal gear in hypocyclic rolling motion, a driven shaft, a spider moving therewith and coaxial with the drive shaft, and at least six links connecting the spider with the rolling wheel, each link including a pin carried by the spider and an eccentric cam of larger diameter than the pin having a snug rotating fit in an opening in the rolling wheel, whereby the linkage to the driven shaft is positive and the load on the teeth is relatively small thus permitting a large number of small teeth and a short eccentricity of cams and links.

2. The gear of claim 1 in which there is a second spider on the opposite side of the rolling wheel, and the links each have two pins, one for each spider.

3. The gear of claim 1 in which the driving shaft has a counterweight on each side of the cam, there is a second spider on the opposite side of the rolling wheel, and the wheel and the spiders are recessed to receive the counterweights and the gear and the rolling wheel teeth are of double helical type in order to minimize end play.

JESSE ATWATER JACKSON.

REFERENCES CITED

The following references are of record in the file of this patent:

UNITED STATES PATENTS

| Number | Name | Date |
|---|---|---|
| 276,776 | Clemans | May 1, 1883 |
| 978,371 | Harrison | Dec. 13, 1910 |
| 1,217,427 | Fast | Feb. 27, 1917 |
| 1,641,766 | Laukhuff | Sept. 6, 1927 |
| 1,694,031 | Braren | Dec. 4, 1928 |
| 2,170,951 | Perry | Aug. 29, 1939 |

FOREIGN PATENTS

| Number | Country | Date |
|---|---|---|
| 361,015 | Great Britain | Nov. 19, 1931 |
| 547,402 | Great Britain | Aug. 26, 1942 |
| 390,890 | France | Oct. 16, 1908 |
| 615,299 | France | Jan. 4, 1927 |